Figure 1:
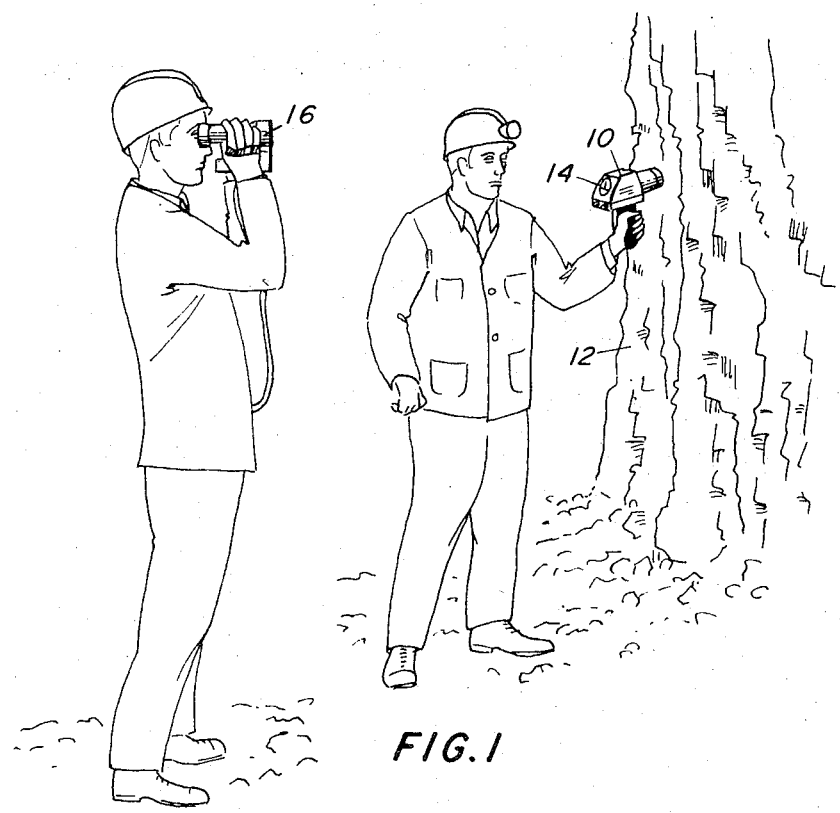

United States Patent [19]
Merrill

[11] 3,761,713
[45] Sept. 25, 1973

[54] METHOD OF DETECTING LOOSE ROCK

[75] Inventor: Robert H. Merrill, Lakewood, Colo.

[73] Assignee: The United States of America as represented by the Secretary of the Interior, Washington, D.C.

[22] Filed: July 13, 1971

[21] Appl. No.: 162,065

[52] U.S. Cl............... 250/341; 23/230 EP; 73/154, 73/340, 73/355
[51] Int. Cl............................ G01v 9/00, G01j 5/18
[58] Field of Search.................. 73/355 R, 355 EM, 73/340, 154; 250/83.3 H, 83.3 HP; 23/230 EP

[56] References Cited
UNITED STATES PATENTS

| | | | |
|---|---|---|---|
| 3,217,550 | 11/1965 | Birman | 73/154 X |
| 2,403,704 | 7/1946 | Blau | 73/432 R |
| 3,153,147 | 10/1964 | Bradley et al. | 250/83.3 H |
| 3,278,746 | 10/1966 | Fiat | 250/83.3 H |
| 3,596,519 | 8/1971 | Blonder et al. | 73/355 R |
| 3,531,642 | 9/1970 | Barnes et al. | 73/355 R X |
| 3,017,513 | 1/1962 | Messelt | 250/83.3 H |

OTHER PUBLICATIONS

Raytek Inc. Publication: Spot Trouble Instantly With Raytek Raynger . Received in Gp. 280, Sept. 16, 1966.

*Primary Examiner*—Richard C. Queisser
*Assistant Examiner*—Frederick Shoon
*Attorney*—Ernest S. Cohen et al.

[57] ABSTRACT

A method of detecting loose rock in excavated passages through subterranean structures by an analysis of thermal conditions at the surfaces of said passages measured with infrared responsive instruments.

1 Claim, 3 Drawing Figures

PATENTED SEP 25 1973

3,761,713

INVENTOR
ROBERT H. MERRILL

BY Ernest S. Cohen
Gersten Sadowsky
ATTORNEYS

METHOD OF DETECTING LOOSE ROCK

The invention is in a thermometric remote sensing method for manifesting physical conditions in the structure characterizing natural formations. In effect, thermal conditions at or near surfaces of such formations are measured to provide a basis for information on the integrity of structure underyling these surfaces.

Detection of hazardous conditions hidden from sight within a natural formation is attainable in comparative safety when in accordance with the present invention measurements of surface thermal conditions are taken at locations remote from the formation surface. The invention is thus of special utility in investigating hazards in and around mines and tunnels, and particularly for locating loose rock in roofs, pillars and faces of underground passages, as in mines. Principal among the efforts previously made to locate loose rock in mines is a scaling procedure wherein rock is struck with a bar to sound it for solidity. An inspector stationed near or under suspected rock to sound it is constantly exposed to a fall of dislodged rock. A method as described herein permits inspections of mine or tunnel surfaces for loose rock without hazardous probing of the sort heretofore required.

Surface temperature differences detectable over the surface of a mine formation can be indicative of the mine infrastructure condition. This appears from the recognition that rock along the edge of an underground opening is subject to two temperature environments: the temperature of the air in the opening, and the temperature of the rock surrounding the opening. Where the rock on this edge opening is solid, the rock will reach an equilibrium temperature that depends upon the temperature and flow of the air, the thermal conductivity of the rock and its ambient temperature. In the event a loose rock exists among this solid rock, a temperature barrier arises to some extent between the loose and solid rocks with the result that the loose rock temperature tends to follow the temperature of the air to a greater degree than does the temperature of the solid rock. Therefore, depending upon the temperature differences between the rock and the air, the loose rock will be warmer or cooler than the solid rock. Although these temperature differences are relatively small, their presence is detectable in measurements of temperature on exposed surfaces of the containing rock formations. Such surface temperatures are measurable by remote-sensing infrared apparatus having a capability of indicating temperature differences in the order of 0.1° C. Suitable apparatus include devices which are either an infrared thermometer or an infrared scanner. Examples of the invention hereinafter disclosed are derived employing an infrared thermometer of the type described in an article entitled "Sensing Biological Environments with a Portable Radiation Thermometer" by David M. Gates, in the journal Applied Optics, vol. 7, No. 9, of September 1968, pages 1803 to 1809, and a AN/-PAS-7 infrared scanner provided by the Department of the Army, Electronics Command's Night Vision Laboratory. Either of these instruments which are capable of detecting small temperature differences as low as 0.2° C, is initially calibrated by a routine test setting to determine the significance of the readings or showings presented thereby, and thereafter used alone to facilitate a procedure according to the present invention.

An object of the present invention is therefore to provide a method for determining a physical state of underground or covered structure by detecting thermal conditions in such structure.

Figure 2:
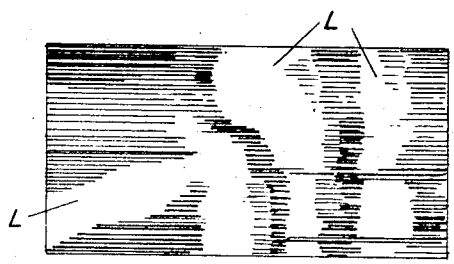
Figure 3:
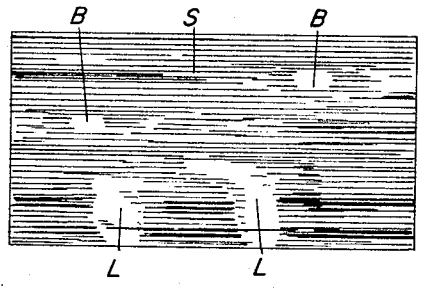

This and other advantages, features, and objects of the invention will become more apparent from the following description taken in connection with the illustrative embodiments in the accompanying drawings, wherein:

FIG. 1 pictorially represents preferred procedures for a method in accordance with the present invention; and FIGS. 2 and 3 illustrate exemplary records produced by a procedure represented in FIG. 1.

It can be demonstrated that the temperature differences distinguishing areas of loose rock from that of solid rock is dependent on the temperature of the mine air, as indicated on open bulb thermometers in the mine, in contact with the mine surface. A mine was sealed as well as practical, and ventilation air was left off overnight, so that when the temperature difference between the air in the mine and the edge of the mine opening was thus made negligible, it was contemporaneously determined that the loose and solid rock were at the same temperature. However, within 15 minutes after air fans were started, the air-to-surface rock temperature differences were from 1° C to 7° C, depending largely upon the outside air temperature. Loose to solid rock temperature differences were as high as 2° C at the portal and as low as 0.2° C at distant points from the portal ranging from 1,000 to 2,000 feet air travel distance. Measurements of rock surface temperatures were taken as indicated in FIG. 1, with a portable, hand-held thermometer 10 by aiming this instrument at selected points centered in areas of interest extended across the rock surfaces 12. Infrared radiation from the mine surfaces thus detected give rise to the temperatures which are directly readable on a meter 14 mounted in the rear of the instrument. Since such mine surfaces of interest are generally surrounded by other sources of radiation that are more or less indicative of the same temperature, these measured values of surface temperatures are normally free of error.

Temperature measuring instruments adaptable for use in practicing the present invention include an infrared thermometer, model PRT-10L, manufactured by Barnes Engineering Company of Stamford, Connecticut. This lightweight, hand-held instrument includes a meter, which is initially set by using a target of known temperature to take into account the internal temperature level of the instrument. The indicated temperature range of the instrument is from −10° to +60° C, and it is switchable to a differential scale allowing a reading of ±5° C from a 0 setting made when aimed at a selected target. Its field of view of 7° permits a minimum target area size of 2 inches in diameter to range to a 6 feet diameter target area at 50 feet from the front of the instrument, and a proportionately larger target areas at greater distances. However, owing to aperture width, the "practical" maximum distance for the thermometer is about 50 feet.

In another illustration of the phenomenon underlying the present invention measurements taken of temperatures in a mine showed the air-to-rock temperature differences before the mine vent fans were started to be 0 to 0.5° C, and after ventilation fans were started, when air-to-rock temperature differences appeared as 3° C at the portal (incoming air) and about 0.3° C at the discharge fan, the temperature difference between loose and solid rock was from 1° C at the portal to 0.2°

C at the discharge fan. However, loose and solid rock both react quickly to new air temperature. In one mine the air-to-surface rock temperature differences were about 3° C near the portal and about 0.5° C at points in the working area some 2,000 feet away. The estimated ambient rock temperature was determined to be from about 16.5° to 17° C. When on a particular day outside air temperature rose from a low of 14° C to a high of about 19° C, the loose rock was cooler than the solid during the early morning and warmer than the solid rock during the later hours of the day. These differences were from 0.2° to 1.0° C. Further, since the air to surface temperature differences at newly blasted faces are significantly greater than at areas where relatively long exposed rock surfaces are extant, loose to solid rock temperature differences vary accordingly. Evidence of the effect of this temperature gradient appeared around a new exposure having loose-to-solid temperature differences from 1.0° to 1.5° C, whereas these differences were about 0.2° to 0.3° C along pillars only 30 feet away that had been exposed to air temperatures for several days. Where mine air is hot and moist, instrument drift resulting in unreliable readings would be a consideration. However, encasing the instrument in a bag of plastic transparent to infrared radiation, and placing a dessicant in the housing around the electronic circuit in the instrument and the equipment used in such mines, were found to solve the drift and realiability problem.

An infrared scanner 16 is held directed at a mine wall as shown in FIG. 1 to detect temperature differences arising from thermal condition variants due to loose rock inclosures of this wall and such detections are manifested as shown in FIGS. 2 and 3 by irregularly shaped, generally even toned light area representations L distinguishable from darker toned areas. These visual images of the thermal differences thus reveal the approximate shapes or extents of the loose rock as well as its location. In FIG. 3, a loose slab of rock S appears as a darker toned representation since it is supported adequately by rock bolts whose plates are also indicated as thermal images B. In both figures all loose rock L is in fact warmer than the solid rock. Thermal temperature differences of about 0.2° to 0.5° C were measured with infrared thermometer 10 in the areas represented in both FIGS. 2 and 3. However, the thermal images in both figures would be reversed were the loose rock cooler than the solid rock. The infrared scanner will detect loose rock temperatures of pieces up to about 2 feet in diameter from a distance of several feet, although observations of thermal differences are possible as close as 1 to 2 feet and as distant as 300 feet. Because of the field of view the infrared thermometer should be held within a distance of about 20 feet, or less, to observe the more usual temperature differences.

Among other applications of the present invention are the detection of misfires in mine blasts, the location of underground water courses, underground fires, and combustion in coal waste dumps or coal storage piles. Detonated mine blasts warm the surrounding rock. Thus, by remote examination of the temperatures at the mine face, the "hot spots" on the face are compared with the thermal radiation, and the indications of coal areas are noted at the same location where a blast hole should be, there arises the presumption that the blast hole did not detonate. Underground water courses also create rock temperature differences in the rock surrounding the flow of water. By examination of these temperature differences, the hotter or cooler areas created by the way can be detected and mapped, and from the maps, the water course can be charted. Exposed, yet invisible to the eye fire in underground room, stope shaft, or other opening, can be detected by temperature differences. Further, a fire in an adjacent room, wherein there is a pillar of coal or rock between one room and another, can be found by temperature changes along the wall of the pillar. Combustion in a waste dump or a coal pile is seldom seen until it is extensive enough to create visible flame or smoke. Because the temperature of combustion is much higher than the average temperature of the dump or pile, the location of the hot spots serves as an indication of the location of the combustion.

Considering that the temperatures detected by the remote sensing disclosed herein are those at radiating surfaces, loose rock from 1 to 20 inches in thickness can be identified in situ since such rock has been found to engender sufficient differences in surface temperatures to allow a procedure according the present invention. Even though thicker loose rock is less likely to give the requisite temperature differences, it nevertheless provides a stronger roof in average mine conditions. However, the loose material of interest herein is generally from 1 to 12 inches thick. A suitable calibration curve may be derived to relate the thermometry to the thickness of the rock. Except for the thickness of loose rock, the size and shape thereof does not appear to significantly affect the temperature measurements. Outer surface characteristics, such as the extent of uniformity, and rock type are also not significant factors in the measurements of surface temperatures.

While a preferred form of the method of the invention has been described and illustrated, it is to be understood that the invention is not limited thereby but is susceptible to changes in form and details.

I claim:

1. A method for identifying the presence of discontinuities within the physical structure of an underground mass of basically solid natural substances, said mass having an indeterminate thickness from a surface thereof which defines a subterranean passage through said mass from within which said surface is exposed to optical observation, and said mass being further characterized by thermal conditions there in which are significantly affected by temperature and flow properties of a fluid environment within said passage which is at said exposed surface, comprising directing a sensing part of a thermal condition detector from within said passage at predetermined areas of said exposed surface, and activating said part thereat so as to chart for each such area a pattern of indicia representing thermal conditions over said exposed surface thereof which are indicative of said affected thermal conditions of said mass whereby distinguishable indicia variations appearing in said patterns are determinative of said discontinuities in said mass.

* * * * *